United States Patent Office.

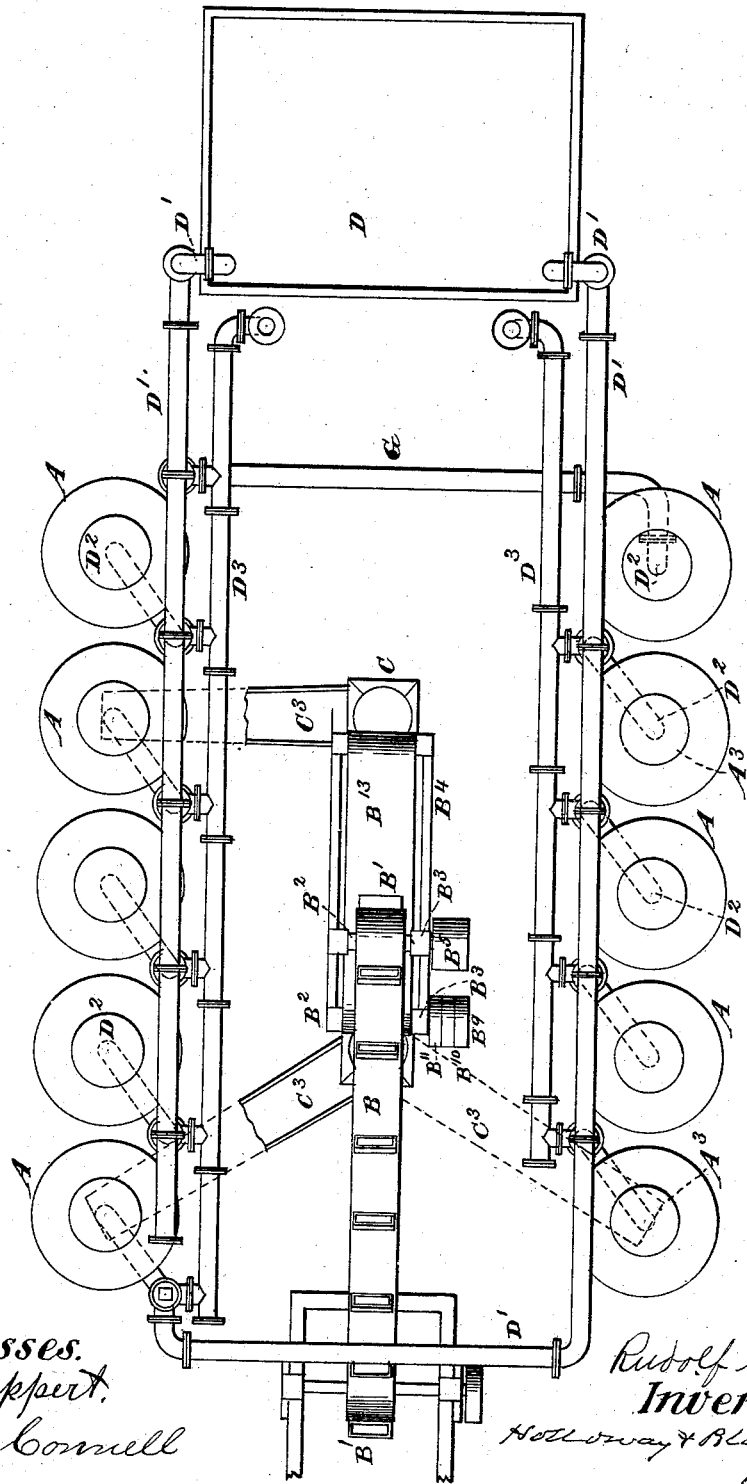

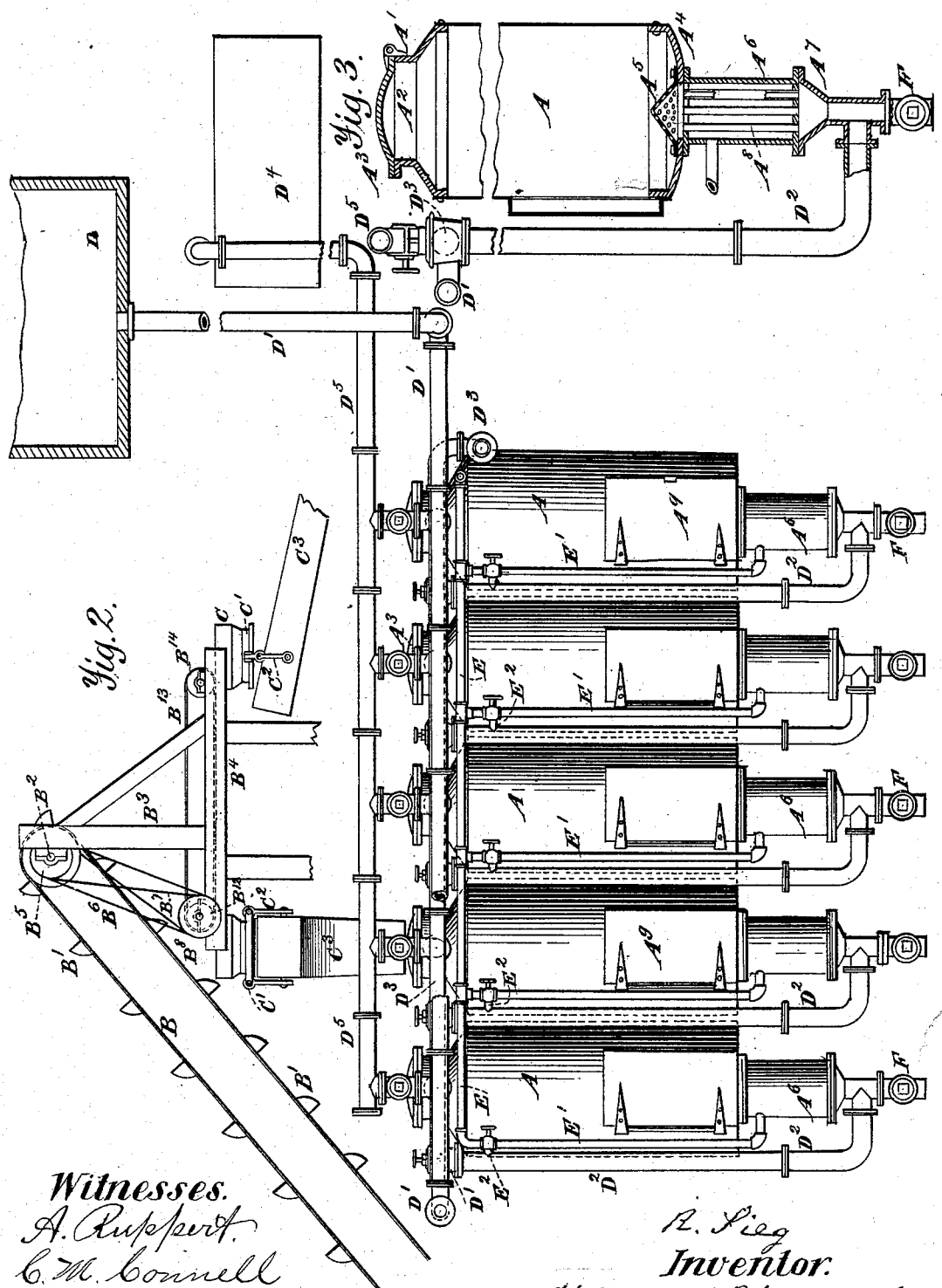

RUDOLF SIEG, OF NEW ORLEANS, LOUISIANA, ASSIGNOR TO EMERSON FOOTE, OF NEW YORK, N. Y.

DIFFUSION APPARATUS.

SPECIFICATION forming part of Letters Patent No. 268,949, dated December 12, 1882.

Application filed December 15, 1880. Renewed August 30, 1882. (No model.)

*To all whom it may concern:*

Be it known that I, RUDOLF SIEG, a citizen of the United States, residing at New Orleans, in the parish of Orleans and State of Louisiana, have invented certain new and useful Improvements in Diffusion Apparatus; and I do hereby declare the following to be a full, clear, and exact descripton of the invention, such as will enable others skilled in the art to which it appertains to make and use the same, reference being had to the accompanying drawings, and to letters or figures of reference marked thereon, which form a part of this specification.

My invention relates to improvements in an apparatus for extracting the saccharine matter from cane-stalks, sorghum, cornstalks, beets, and other sugar-producing substances by what is termed the "diffusion process;" and the objects of my improvements are, first, to provide such a construction and combination of instrumentalities as will permit the operator to carry on an uninterrupted extraction of saccharine matter from cane-stalks, sorghum, cornstalks, beets, and other sugar-producing substances which are capable of being sliced or cut into small pieces; second, to provide a novel combination of devices for the introduction of the sliced material into the vessels in which the diffusion takes place; third, to provide the necessary means for the introduction of water and steam into the diffusers; fourth, to provide for the proper heating of the water and juice or saccharine matter as it passes through the apparatus, and for drawing off the juice and reducing its temperature before it passes to the clarifiers; and, fifth, to provide such devices and combinations thereof as are required to produce the effects hereinafter described. I attain these objects by the mechanism illustrated in the accompanying drawings, in which—

Figure 1 is a plan view of my improved apparatus, showing two series of diffusing-vessels, pipes for conducting water thereto and for conducting away the juice, a reservoir for the water, and mechanism for elevating the cut substance to be treated and for conducting it to the diffusers. Fig. 2 is an elevation showing one series of diffusers, with doors for emptying them, heaters attached to their lower ends, the pipes required in the operation of the apparatus, a tank for water, and one for the reception of the juice after it has passed through the diffusers, and the machinery for elevating and distributing the material; and Fig. 3 is a sectional elevation of one of the diffusers, its heater and pipes, and a removable conical strainer placed in the bottom of the diffuser.

Similar letters refer to similar parts throughout the several views.

In constructing an apparatus for the extraction of saccharine matter from sugar-producing substances I prefer to arrange the diffusers in two rows, as shown; but they may be arranged in a circle, if preferred, or in any other convenient manner; or they may be used separately. In either event the construction will be substantially as follows:

To the ends of a sheet-metal cylinder, A, of any required dimensions, there are riveted an upper and a lower cast head, the upper one, A', being supplied with a man-hole or aperture, $A^2$, through which access can be had to the interior of the vessel when desired, and through which the material to be treated is passed, it being closed when desired or when in use by a tightly-fitting cover, $A^3$, which may, if preferred, be hinged to the head.

Into the lower end of the vessel A there is riveted a head, $A^4$, which has an aperture formed in its center, said aperture being covered by a removable conical strainer or perforated plate, $A^5$, which is for the purpose of preventing the pieces of the material which is being treated from falling into a heater soon to be described, and also for the purpose of comminuting the juice or water which passes through it, and for causing it to circulate evenly through the body of the material, it being removed when it is desirable to gain access to the heater for cleaning or repairing it. This vessel or cylinder, which constitutes the diffuser, is also provided with doors $A^9$, which are hinged or otherwise secured to said vessel, and are for the purpose of being opened when it is desirable to remove the solid portions of the substance treated therefrom.

The heater above alluded to is designated by $A^6$, there being one to each diffuser, and consists of a cylinder of metal of the required length and diameter, having flanges upon both of its ends, the upper one for securing it to the diffuser and the lower one for the reception of a head, $A^7$, through which there is a passage for the juice or water used in the diffusion of the material. The heater $A^6$ is also provided with heads at each of its ends, through which pass a series of tubes, $A^8$, and in which they are firmly secured, the juice or water, or both, which is admitted to the heater passing through said tubes, and thus becoming heated by steam, which is admitted to the space around the tubes through a suitable pipe, to be hereinafter described.

As a means of introducing the material to be treated into the diffusers, there is placed above and between said diffusers and supported upon suitable frame-work a mechanism for elevating the cut cane or other substances and distributing it to the diffusers. This mechanism consists of an elevator, B, the lower end of which is held in a suitable frame placed near the point where the cutting or slicing of the materials is done, it being fed to the elevator by any convenient method.

The elevator B is composed of an endless belt of some flexible material, such as will admit of its being passed around drums at its ends, and of buckets $B'B'$ for carrying forward the slices. The upper end of the elevator B is supported upon a shaft, $B^2$, placed in bearings formed in or placed upon a frame, $B^3$, which, as shown in Fig. 2, is elevated considerably above the upper ends of the diffusers, in order that the material carried up by the elevator may be discharged into a trough or receptacle, $B^4$, which is arranged horizontally under the upper end of the elevator, but considerably above the diffusers.

The shaft $B^2$ may be driven by any prime mover, it having a pulley placed upon it to receive a belt for that purpose. It also has upon it a pulley, $B^5$, over which two belts, $B^6$ and $B^7$, pass, the former being a straight one and the latter a crossed one, in order that without changing the direction of rotation of the shaft $B^2$ the shaft $B^8$ may be rotated in either direction, it having upon it three pulleys $B^9$, $B^{10}$, and $B^{11}$, $B^9$ and $B^{11}$ being fitted to revolve freely on the shaft, while $B^{10}$ is firmly secured thereon, so that by sliding the straight belt onto the latter a motion in one direction will be imparted to shaft $B^8$, and by sliding the same belt onto its loose pulley and the cross-belt onto $B^{10}$ said shaft $B^8$ will be caused to rotate in the contrary direction. This shaft $B^8$ is supported in bearings formed in the ends of frame $B^3$, and has upon that portion of it which is between the sides of said frame a drum, $B^{12}$, around which a linen, leather, or flexible band, $B^{13}$, passes, and from it extends to a drum, $B^{14}$, arranged upon the opposite end of the trough $B^4$ to that upon which the shaft carrying the pulleys is located. The arrangement of the apron or band $B^{13}$ is such that the material carried up by the elevator B as it is discharged therefrom falls upon and is by it carried toward either end of the trough or receptacle $B^4$, according to the requirements of the case.

Attached to the under side of the trough $B^4$, at each of its ends, is a funnel or otherwise formed open receptacle, C C, in the lower end of which there is formed an annular groove; or it may be a projecting flange upon which rings $C'$ rest, and upon which they turn. To these rings links or bars $C^2$ are attached, the lower ends of which are secured to troughs or chutes $C^3$ $C^3$, which conduct the material from the receptacles C C to the diffusers A A, as shown in Figs. 1 and 2 of the drawings, the arrangement being such that when any one of the diffusers has become filled the chutes may be turned upon the receptacles C C, and the material directed into any other one of the series within reach of the chute.

For the purpose of extracting the saccharine matter contained in the different kinds of material treated by diffusion, there is provided a tank, D, of any desired form and dimensions, which is to be sufficiently elevated to cause its contents to flow through the diffusers or vessels A when put in communication therewith by suitable pipes. This tank is to be supplied with water from any convenient source, running water being preferred when it can be had of the required quality. It may, however, be supplied by a pump or by any of the well-known devices for elevating water from a well or other source of supply which is below the tank; or it may under some circumstances be forced into the diffusers by a pump; but the elevated reservoir is preferred on account of the fact that it is more convenient, and the supply to the diffusers is more steady.

To the tank D pipes $D'$ are attached, which convey water therefrom to any one or all of the diffusers through the vertical pipes $D^2$, which enter the neck of the heater below its lower head, so that before entering said heater the water may be heated by steam entering through a pipe soon to be described. One of the pipes $D'$ extends to and past all of the diffusers in one of the rows, and is then carried across to the other row, as shown in Fig. 1, where it is connected to a cock or valve attached to the juice-pipe $D^3$, from which a branch extends to the first of the series of diffusers on that side. The upper ends of the vertical pipes $D'$ are each supplied with plug-cock or valve of peculiar construction for the purpose of permitting the water or juice, as the case may be, which for the time is flowing through said pipes, to pass down into the vertical pipes $D^2$, or one of them, and so into the heater and the next series of diffusers. When the plug-cock is used for this purpose the key thereof is to be made hollow, and to have an aperture in the shell thereof, so that the liquid may enter the cavity and be directed downward.

The juice-pipes $D^3$, above alluded to, run along nearly parallel with the water-pipes D'. In the arrangement of parts here shown there are two of the juice-pipes—one for each row of diffusers. The water-pipes D' and the juice-pipes D³ are both connected to the plug-cocks by suitable flanges or in any convenient manner, and the liquid from either may be caused to pass through said cocks at any particular time, to the exclusion of that in the other, by the proper manipulation thereof.

The juice-pipes D³ are each supplied with a cock or valve opposite or nearly opposite the different diffusers, by means of which the flow of the juice may be intercepted before it passes into the upright pipes, and directed into the reservoir D⁴ through a discharge-pipe, D⁵, which is the pipe through which the finished juice from all of the diffusers is drawn off or through which it passes in being discharged from the apparatus.

For the purpose of heating the water before it enters the diffusers, or for reheating the juice after it has left one of them and before it enters the other, there is provided a steam-pipe, E, which runs along by the side of the diffusers at any convenient point, and which may receive steam from any generator convenient to the apparatus. From the pipe E, just alluded to, there are extended branches E' E'—one for each of the heaters. These branches are each provided with a regulating-valve, by which the amount of steam allowed to pass them can be controlled, which should be so regulated as to maintain the juice in each of the diffusers at from 170° to 180° Fahrenheit until it reaches the last one through which it passes, which one does not have any steam admitted to it, as it is desirable to have the temperature of the juice somewhat reduced before it enters the clarifiers. From each of the branch pipes E' there extends to the pipes D² a pipe, E², which, when desired, may be used to conduct a portion of the steam into the pipes D², where it will mingle with the water or juice before it enters the heater and at the same time that steam is entering the heaters.

For the purpose of drawing off any water or juice that may remain in the heaters or diffusers, when it is necessary to open the latter for the purpose of removing the solid portions of the material, there is attached to the lower heads of each of the heaters a cock, F, which, upon being opened, will allow any liquid that may be in them to be drawn off into any suitable vessel or conduit that may be provided for its reception.

For the purpose of connecting the heaters of one of the rows of diffusers and heaters to the opposite row, there is provided a cross-pipe, G, which at one of its ends connects with the end one of one of the rows and at its opposite end with one of the vertical pipes D², so that, when desired, the juice or water may flow across from one to the other of the rows.

The open ends of the juice-pipes D³ D³ may be connected to other pipes or spouts, which may be used to conduct the juice or water to any suitable reservoir for their reception.

The method of operating this device is as follows: The parts being constructed and arranged substantially as hereinbefore described, and the material cut into the required lengths and placed in the buckets of the elevator, said elevator is put in motion and the sliced material is carried to the upper end thereof, where it is delivered onto the belt or apron B¹³, by which it is carried in either direction, as desired, to the hopper C, into which it is delivered and from which it passes, through one of the spouts C³, to some one of the diffusers. Supposing the diffuser being filled to be the end one of one of the rows, its cover or head is removed, so as to permit the material to pass into it. When a sufficient amount has been placed therein the valve or plug of the cock of the first vessel is so turned as to allow water from the water-pipe D' to flow into the vertical pipe D², connected therewith, and this may be done while the sliced cane or other material is being inserted, steam at the same time being allowed to pass into the inflowing water and into the heater. When the first diffuser has been filled its cover is closed, and the valve or cock connected therewith is opened toward the juice-pipe leading from this diffuser, steam continuing to be let into the heater connected therewith, and, if it is found necessary to heat the juice to a temperature of from 170° to 180° Fahrenheit, into the water or juice also. When this has been accomplished the remaining diffusers or vessels of the series are filled and treated in succession in the same manner, the juice from the first diffuser, if desired, being permitted to flow through any or all of the succeeding ones, thus being constantly enriched by being brought in contact with fresh slices of cane or other sugar-producing material. As soon as the desired amount of juice has been drawn off from the first vessel or diffuser the valve or cock leading to the next vessel in course of being filled with slices is opened toward the juice-pipe of the vessel or diffuser having just discharged its juice, whereby all of the juice that remained in the discharge-pipe is carried into the next vessel or diffuser. When all of the juice of a desired quality has been drawn from any one of the diffusers the valve or cock controlling its flow is shut and the three-way cock or valve upon the vertical pipe of the next vessel in the course is opened and steam is admitted to the vessel from which the charge of juice had first been sent to the clarifier, at which time steam is shut off from the first filled vessel or diffuser, when by opening the door in its side its contents can be withdrawn into a car running upon rails properly placed, and it can be removed to any desired locality. For the purpose of isolating the first vessel or the one being filled with fresh material, the cock or valve in the juice-pipe leading to it is closed and the one connected to the next vessel is opened, so as to communicate with the water-pipe. By these movements of the cocks or valves the first vessel, or the one being filled with fresh material, is entirely isolated from the next in succession, but the water-pressure is transferred from the vessel which is being emptied of its spent slices to the next in succession.

I am aware that prior to my present invention saccharine matter has been extracted from various substances by diffusion, some of the methods for producing such a result being shown in patents granted to S. Schuzenbach, May 17, 1870, No. 103,090; to G. Wilkinson, A. L. Passoz, J. B. Lafarque, and A. E. Dutreih, April 8, 1873, and to myself November 19, 1878. I am also aware that a method of extracting saccharine matter is described on pages 298, 299, and 314 to 321 of Zucherfabrikation by Dr. R. Staunner, Braunschweig, 1874, and also in Fabrication du Sucre by Dr. Charles Staunner, of Paris, pages 116 to 130. I therefore do not claim broadly such method. Neither do I claim broadly an apparatus for the accomplishment of such a result, but intend to limit my present invention to the combinations shown and described; and, hence,

Having thus described my invention, and the method of operating it, what I claim, and desire to secure by Letters Patent, is—

1. A diffuser for extracting saccharine matter from sugar-cane, sorghum, and other sugar-producing substances, consisting of a closed vessel or series of vessels having an aperture in their upper ends for the admission of the material to be treated, said aperture being closed by a cap or lid, so as to form a tight joint, and a heater or heaters arranged upon its or their lower ends for heating the liquid before it enters the diffuser, where it comes in contact with the body of the material being treated, substantially as set forth.

2. The combination of a diffuser, A, heater $A^6$, and strainer $A^5$, the parts being arranged and to operate substantially as described.

3. The combination of the steam-pipe E, branches $E'$ and $E^2$, heaters $A^6$, and vertical pipes $D^2$, the arrangement of the parts being substantially such as is herein described, whereby steam can be let into the heaters or into the vertical pipes, or into both, at pleasure, for the purpose stated.

4. In an apparatus for extracting saccharine matter, the combination of the diffusers A, heaters $A^6$, water-pipes $D'$, juice-pipes $D^3$, general discharge-pipe $D^5$, reservoir $D^4$, and steam-pipes E, $E'$, and $E^2$, the parts being arranged for joint operation, substantially as herein described.

5. In combination with the diffusers of an apparatus for extracting saccharine matter from various substances, the elevator B, suitable mechanism for driving the same, the receptacle $B^4$, the reversible flexible band or apron $B^{13}$, the receptacles C C, and the swiveled chutes $C^3$ $C^3$, the parts being arranged for joint operation, substantially as set forth, whereby the material to be treated is elevated and conducted to the different vessels or cylinders constituting the diffuser.

In testimony whereof I affix my signature in presence of two witnesses.

RUDOLF SIEG.

Witnesses:
ANDREW HERO, Jr.,
D. I. DOWERS.